US010423831B2

(12) United States Patent
De Mers

(10) Patent No.: US 10,423,831 B2
(45) Date of Patent: Sep. 24, 2019

(54) UNMANNED AERIAL VEHICLE BASED EXPANSION JOINT FAILURE DETECTION SYSTEM

(71) Applicant: Honeywell International Inc., Morris Plains, NJ (US)

(72) Inventor: Robert E. De Mers, Nowthen, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/705,594

(22) Filed: Sep. 15, 2017

(65) Prior Publication Data

US 2019/0087658 A1 Mar. 21, 2019

(51) Int. Cl.
*G06K 9/00* (2006.01)
*G01M 5/00* (2006.01)
*G05D 1/00* (2006.01)
*G01M 11/08* (2006.01)
*G01B 11/26* (2006.01)

(52) U.S. Cl.
CPC .......... *G06K 9/00637* (2013.01); *G01B 11/26* (2013.01); *G01M 5/005* (2013.01); *G01M 5/0008* (2013.01); *G01M 5/0075* (2013.01); *G01M 11/081* (2013.01); *G05D 1/0094* (2013.01); *B64C 2201/127* (2013.01)

(58) Field of Classification Search
CPC ............ G06K 9/00637; G01M 5/0008; G01M 5/0075; G01M 11/081; G05D 1/0094
See application file for complete search history.

(56) References Cited

U.S. PATENT DOCUMENTS

| 3,992,707 | A | | 9/1976 | Schmidtlein et al. |
| 4,550,376 | A | | 10/1985 | Maciejczak |
| 4,664,340 | A | | 5/1987 | Jackson |
| 4,789,947 | A | | 12/1988 | Maciejczak |
| 4,899,296 | A | * | 2/1990 | Khattak ................. G01B 11/16 348/148 |

(Continued)

FOREIGN PATENT DOCUMENTS

| CN | 105597308 A | 5/2016 |
| CN | 106054916 A | 10/2016 |

(Continued)

OTHER PUBLICATIONS

Gillins, et al., "Cost-Effective Bridge Safety Inspection Using Unmanned Aircraft Systems (UAS)," Feb. 2016, 10 pp.

(Continued)

*Primary Examiner* — Behrang Badii
*Assistant Examiner* — Daniel L Greene
(74) *Attorney, Agent, or Firm* — Shumaker & Sieffert, P.A.

(57) ABSTRACT

A camera captures an image of a structural bearing, such as a hanger bearing or a rocker bearing. Additionally, an instrument detects a temperature. A computing system determines, based on the temperature, an expected angle of the bearing relative to a base line. The computing system also determines an actual angle of the bearing relative to the base line. The computing system superimposes a first line on the image, the first line indicating the expected angle. Furthermore, the computing system superimposes a second line on the image, the second line indicating the actual angle.

18 Claims, 7 Drawing Sheets

(56) References Cited

U.S. PATENT DOCUMENTS

| | | |
|---|---|---|
| 5,150,857 A | 9/1992 | Moffitt et al. |
| 5,152,478 A | 10/1992 | Cycon et al. |
| 5,295,643 A | 3/1994 | Ebbert et al. |
| 5,559,695 A | 9/1996 | Daily |
| 5,575,438 A | 11/1996 | McGonigle et al. |
| 5,695,153 A | 12/1997 | Britton et al. |
| 5,904,724 A | 5/1999 | Margolin |
| 6,206,324 B1 | 3/2001 | Smith |
| 6,377,875 B1 | 4/2002 | Schwaerzler |
| 6,422,508 B1 | 7/2002 | Barnes |
| 6,450,445 B1 | 9/2002 | Moller |
| 6,502,787 B1 | 1/2003 | Barrett |
| 6,536,553 B1 | 3/2003 | Scanlon |
| 6,575,402 B1 | 6/2003 | Scott |
| 6,588,701 B2 | 7/2003 | Yavnai |
| 6,604,706 B1 | 8/2003 | Bostan |
| 6,622,090 B2 | 9/2003 | Lin |
| 6,665,594 B1 | 12/2003 | Armstrong |
| 6,691,949 B2 | 2/2004 | Plump et al. |
| 6,694,228 B2 | 2/2004 | Rios |
| 6,712,312 B1 | 3/2004 | Kucik |
| 6,721,646 B2 | 4/2004 | Carroll |
| 6,813,559 B1 | 11/2004 | Bodin et al. |
| 6,847,865 B2 | 1/2005 | Carroll |
| 6,873,886 B1 | 3/2005 | Mullen et al. |
| 6,925,382 B2 | 8/2005 | Lahn |
| 6,959,895 B2 | 11/2005 | Cylinder |
| 6,961,441 B1 | 11/2005 | Hershey et al. |
| 7,000,883 B2 | 2/2006 | Mercadal et al. |
| 7,032,861 B2 | 4/2006 | Sanders, Jr. et al. |
| 7,044,074 B2 | 5/2006 | Harrie et al. |
| 7,044,422 B2 | 5/2006 | Bostan |
| 7,107,148 B1 | 9/2006 | Bodin et al. |
| 7,130,741 B2 | 10/2006 | Bodin et al. |
| 7,149,611 B2 | 12/2006 | Beck et al. |
| 7,158,877 B2 | 1/2007 | Carlsson et al. |
| 7,204,455 B2 | 1/2007 | Sinclair |
| 7,228,227 B2 | 6/2007 | Speer |
| 7,231,294 B2 | 6/2007 | Bodin et al. |
| 7,249,732 B2 | 7/2007 | Sanders, Jr. et al. |
| 7,269,513 B2 | 9/2007 | Herwitz |
| 7,286,913 B2 | 10/2007 | Bodin et al. |
| 7,289,906 B2 | 10/2007 | van der Merwe et al. |
| 7,299,130 B2 | 11/2007 | Mulligan et al. |
| 7,302,316 B2 | 11/2007 | Beard |
| 7,343,232 B2 | 3/2008 | Duggan et al. |
| 7,603,207 B2 | 10/2009 | Abraham et al. |
| 8,060,270 B2 | 11/2011 | Vian et al. |
| 9,609,288 B1* | 3/2017 | Richman ............... H04N 7/183 |
| 2003/0201909 A1* | 10/2003 | Hilliard ................. G08G 1/015 340/940 |
| 2004/0016065 A1* | 1/2004 | Steiger ................. E01D 19/062 14/73.1 |
| 2004/0094662 A1 | 5/2004 | Sanders, Jr. et al. |
| 2004/0129828 A1 | 7/2004 | Bostan |
| 2005/0082421 A1 | 4/2005 | Perlo |
| 2005/0165517 A1 | 7/2005 | Reich |
| 2006/0008137 A1 | 1/2006 | Nagandaripour et al. |
| 2006/0049304 A1 | 3/2006 | Sanders, Jr. et al. |
| 2006/0097107 A1 | 5/2006 | Parks et al. |
| 2006/0102780 A1 | 5/2006 | Parks |
| 2006/0106506 A1 | 5/2006 | Nichols et al. |
| 2006/0121418 A1 | 6/2006 | DeMarco et al. |
| 2006/0192047 A1 | 8/2006 | Goossen |
| 2006/0197835 A1 | 9/2006 | Anderson et al. |
| 2006/0231675 A1 | 10/2006 | Bostan |
| 2006/0235584 A1 | 10/2006 | Fregene et al. |
| 2006/0253228 A1 | 11/2006 | Abraham et al. |
| 2006/0271248 A1 | 11/2006 | Cosgrove et al. |
| 2006/0287824 A1 | 12/2006 | Lin |
| 2007/0018052 A1 | 1/2007 | Eriksson |
| 2007/0022935 A1 | 2/2007 | Griffith et al. |
| 2007/0034734 A1 | 2/2007 | Yoeli |
| 2007/0034738 A1 | 2/2007 | Sanders, Jr. et al. |
| 2007/0034739 A1 | 2/2007 | Yoeli |
| 2007/0051848 A1 | 3/2007 | Mantych et al. |
| 2007/0069083 A1 | 3/2007 | Shams et al. |
| 2007/0093945 A1 | 4/2007 | Grzywna et al. |
| 2007/0129855 A1 | 6/2007 | Coulmeau |
| 2007/0131822 A1 | 6/2007 | Stallard |
| 2007/0193650 A1 | 8/2007 | Annati |
| 2007/0200027 A1 | 8/2007 | Johnson |
| 2007/0221790 A1 | 9/2007 | Goossen |
| 2007/0228214 A1 | 10/2007 | Horak |
| 2007/0244608 A1 | 10/2007 | Rath et al. |
| 2007/0246610 A1 | 10/2007 | Rath et al. |
| 2007/0262195 A1 | 11/2007 | Bulaga et al. |
| 2007/0271032 A1 | 11/2007 | Cheng et al. |
| 2007/0284474 A1 | 12/2007 | Olson et al. |
| 2007/0295298 A1 | 12/2007 | Mark |
| 2008/0023587 A1 | 1/2008 | Head et al. |
| 2008/0033604 A1 | 2/2008 | Margolin |
| 2008/0035786 A1 | 2/2008 | Bilyk et al. |
| 2008/0059068 A1 | 3/2008 | Strelow et al. |
| 2008/0071431 A1 | 3/2008 | Dockter et al. |
| 2008/0078865 A1 | 4/2008 | Bume |
| 2009/0265193 A1 | 10/2009 | Collins et al. |
| 2010/0215212 A1 | 8/2010 | Flakes, Jr. |
| 2011/0203212 A1* | 8/2011 | Matys ................ B28B 23/005 52/562 |
| 2013/0235185 A1* | 9/2013 | Sobotka ............. G01M 5/0025 348/125 |
| 2017/0066459 A1* | 3/2017 | Singh ................... B61L 23/044 |
| 2017/0227968 A1* | 8/2017 | Klinger ................ G05D 1/0214 |
| 2017/0236024 A1* | 8/2017 | Wang ..................... G06T 7/50 382/201 |
| 2018/0067003 A1* | 3/2018 | Michiwaki ............... G01L 1/22 |
| 2018/0130196 A1* | 5/2018 | Loveland ............... G01C 11/02 |
| 2019/0128771 A1* | 5/2019 | Santarone ........... G06F 17/5004 |

FOREIGN PATENT DOCUMENTS

| | | |
|---|---|---|
| CN | 106320173 A | 1/2017 |
| EP | 1767453 A1 | 3/2007 |
| EP | 1868008 A1 | 12/2007 |
| GB | 2394340 A1 | 4/2004 |
| WO | 0015497 A1 | 3/2000 |
| WO | 2004002821 A1 | 1/2004 |
| WO | 2007001369 A1 | 1/2007 |
| WO | 2007058643 A1 | 5/2007 |

OTHER PUBLICATIONS

Adhikari, et al., "Image-Based Change Detection for Bridge Inspection," retrieved from http://www.iaarc.org/publications/fulltext/isarc2013Paper158.pdf on Jun. 2017, 11 pp.

"Unmanned Aerial Vehicle Bridge Inspection Demonstration Project," Minnesota Department Transportation, Jul. 2015, 214 pp. [uploaded in 3 parts].

* cited by examiner

UNMANNED AERIAL VEHICLE BASED EXPANSION JOINT FAILURE DETECTION SYSTEM

TECHNICAL FIELD

This disclosure relates to systems for inspection of structures.

BACKGROUND

Expansion joints are common features in bridges and other structures subject to thermal expansion and contraction. Expansion joints may also be referred to as structural bearings. Example types of expansion joints include pin-and-hanger assemblies, rocker bearings, and so on. Expansion joints allow structural members to expand or contract without damaging the structure.

SUMMARY

In general, this disclosure relates to devices, systems, and methods for detection of expansion joint failures. As described herein, a camera captures images of expansion joint assemblies, such as pin-and-hanger assemblies, rocker bearing, and so on. Additionally, an instrument detects a temperature. A computing system determines, based on the temperature, an expected angle of the bearing relative to a base line. The computing system also determines an actual angle of the bearing relative to the base line. The computing system superimposes a first line on the image. The first line indicates the expected angle. Additionally, the computing system superimposes a second line on the image. The second line indicates the actual angle. In this way, a user may easily compare where the actual angle of the bearing to the angle that bearing should be at, given the temperature. The actual angle differing significantly from expected angle may be a strong indication that the bearing is locked up.

In one example, this disclosure describes a method for inspecting an expansion joint, the method comprising: receiving, by a computing system, an image captured by a camera, the image being of a structural bearing, wherein the structural bearing is a hanger bearing or a rocker bearing; receiving, by the computing system, a temperature measurement generated by an instrument; determining, by the computing system, based on the temperature, an expected angle of the structural bearing relative to a base line; determining, by the computing system, an actual angle of the structural bearing relative to the base line; superimposing, by the computing system, a first line on the image, the first line indicating the expected angle; and superimposing, by the computing system, a second line on the image, the second line indicating the actual angle.

In another example, this disclosure describes a computing system comprising: a transceiver configured to: receive an image captured by a camera, the image being of a structural bearing, wherein the structural bearing is a hanger bearing or a rocker bearing; and receive a temperature measurement generated by an instrument; and one or more processing circuits configured to: determine, based on the temperature, an expected angle of the structural bearing relative to a base line; determine an actual angle of the structural bearing relative to the base line; superimpose a first line on the image, the first line indicating the expected angle; and superimpose a second line on the image, the second line indicating the actual angle.

In another example, this disclosure describes a non-transitory computer-readable storage medium having instructions stored thereon that, when executed, configure a computing system to: receive an image captured by a camera, the image being of a structural bearing, wherein the structural bearing is a hanger bearing or a rocker bearing; receive a temperature measurement generated by an instrument; determine, based on the temperature, an expected angle of the structural bearing relative to a base line; determine an actual angle of the structural bearing relative to the base line; superimpose a first line on the image, the first line indicating the expected angle; and superimpose a second line on the image, the second line indicating the actual angle.

The details of one or more examples of the disclosure are set forth in the accompanying drawings and the description below. Other features, objects, and advantages will be apparent from the description, drawings, and claims.

DETAILED DESCRIPTION

Figure 1:
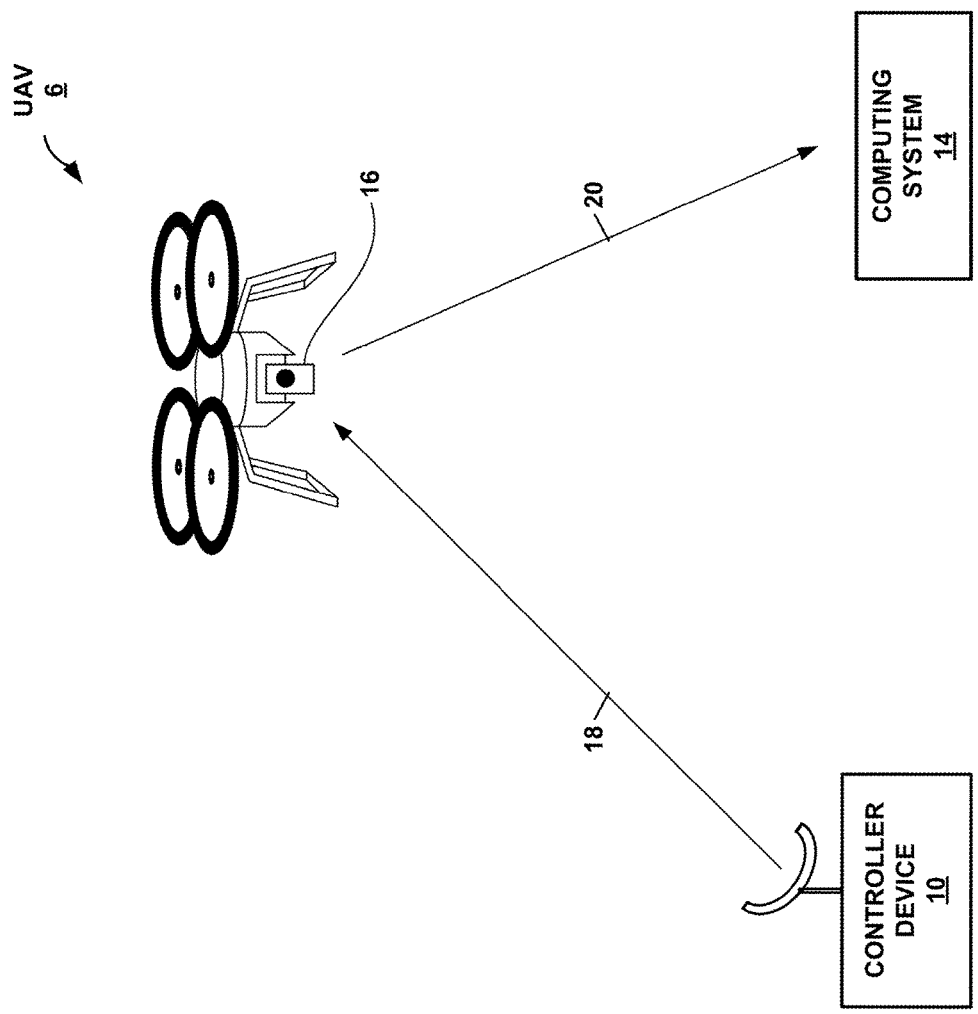
FIG. 1 shows an example Unmanned Aerial Vehicle (UAV) system, which may be configured to implement the techniques of this disclosure.

FIG. 1 shows an example of an Unmanned Aerial Vehicle (UAV) system 2, which may be configured to implement the techniques of this disclosure. UAV system 2 includes a UAV 6, a controller device 10, and a computing system 14. In UAV system 2, controller device 10 controls, for example, the flight path and data gathering functions of UAV 6, and computing system 14 processes the data collected by UAV 6. Although shown as separate devices in FIG. 1, in some UAV systems, the functionality of controller device 10 and computing system 14 may be performed by a common device. Furthermore, in some UAV systems, various functionality described herein with reference to controller device 10 or computing system 14 may additionally or alternatively be performed by UAV 6.

Controller device 10 may, for example, be a general-purpose device such as a personal digital assistants (PDAs), a laptop or desktop computer, a tablet computer, a cellular or satellite radio telephone, a so-called "smart phones," or any other such device. In examples where controller device 10 is a general-purpose device, controller device 10 may be loaded with and may be configured to execute software designed to control UAV 6. In other examples, controller device 10 may be a special-purpose device designed specifically for use with UAV 6.

Controller device 10 communicates with UAV 6 via communication link 18. Communication link 18 may, for example, be a direct link through a radio communication protocol, such as WiFi, Bluetooth, ZigBee, a proprietary protocol, or any other suitable protocol. In other examples, communication link 18 is a network-based link where controller device 10 communicates with UAV 6 through one or more intermediary devices such as gateways, routers, switches, repeaters, or other such network devices.

Computing system 14 may, for example, include a general-purpose device such as a PDA, a laptop or desktop computer, a tablet computer, a smart phone, or any other such device. Computing system 14 may be loaded with and configured to execute software designed to process data collected by UAV 6. In some examples, UAV 6 may be configured to stream data to computing system 14 in real-time or near real time via, for example, a wireless communication link. In other examples, UAV 6 may store data while in flight and transfer the data to computing system 14 at a later time, such as after the completion of a flight.

UAV 6 is shown in FIG. 1 as a quadcopter, but UAV 6 may be any type of UAV including, but not limited to, a rotorcraft, a fixed wing aircraft, an aerostat, or any other such type of UAV. Although the techniques of this disclosure are not limited to any particular type of UAV, UAV 6 may, for example, be a relatively small, low altitude, and low speed UAV, where in this context, small corresponds to under 100 lbs, low altitude corresponds to operating altitudes less than 3000 feet above ground, and low air speed corresponds to air speeds less than 250 knots. Furthermore, it is contemplated that UAV 6 may have hovering capabilities, meaning UAV 6 may have the capability of remaining at an approximately constant location in the air. UAV 6 may be configured to fly with various degrees of autonomy. In some examples, UAV 6 may be under the constant, or near constant, control of a user of controller device 10. In other examples, controller device 10 may deliver a mission, including a flight plan, to UAV 6, and onboard processing circuitry of UAV 6 may be configured to execute the mission, with little or no additional user input.

UAV 6 may, for example, be configured to acquire any or all of audio data, still image data, or video data. In the example of FIG. 1, a camera 16 is mounted on UAV 6. In some examples, camera 16 is mounted on UAV 6 in a turret that allows UAV 6 to change an angle of camera 16 in a vertical direction and/or a horizontal direction.

In accordance with a technique of this disclosure, camera 16 of UAV 6 may capture an image of a structural bearing, such as a hanger bearing or a rocker bearing. Additionally, an instrument mounted on UAV 6 detects a temperature. Various types of instruments mounted on UAV 6 may detect the temperature. For example, an infrared thermometer mounted on UAV 6 may detect a temperature of the bridge bearing or other components of the bridge. In another example, a thermometer may measure the temperature of air surrounding UAV 6. In some examples, instruments mounted on UAV 6 may detect both the air temperature and the temperature of bridge components.

However, structural bearings (e.g., expansion joints) are potential points of structural failure. For example, if a rocker bearing is locked up due to heavy rust, loading due to thermal expansion may be transferred to structural components that are unable to bear the load, potentially resulting in a structural failure. Accordingly, structural bearings are frequently the subject of inspection, especially in bridges and other structures subject to adverse environmental conditions. However, frequent inspection may be difficult and expensive.

UAV 6 may send image data, thermometer data, and other information to computing system 14 via a communication link 20. Communication link 20 may, for example, be a direct link through a radio communication protocol, such as WiFi, Bluetooth, ZigBee, a proprietary protocol, or any other suitable protocol. In other examples, communication link 20 may be a network-based link where controller device 10 communicates with UAV 6 through one or more intermediary devices such as gateways, routers, switches, repeaters, or other such network devices. In examples where UAV 6 stores data and transfers the data to computing system 14 after completion of a flight, communication link 20 may represent a wired connection, such as a USB connection, Lightning connection, or other such connection. In other examples, communication link 20 may represent the manual transfer of data from UAV 6 to computing system 14 by, for example, ejecting a computer readable medium device from UAV 6 and inserting the computer readable medium device into computing system 14.

Computing system 14 determines, based on the temperature, an expected angle of the bearing relative to a base line (e.g., a horizontal or vertical line). Computing system 14 may determine the expected angle based on the temperature in various ways. For example, computing system 14 may store historical images of the bearing along with corresponding temperature readings. In this example, if a temperature corresponding to a current image of the bearing matches a temperature corresponding to a historical image, computing system 14 may determine that the expected angle is the angle of the bearing as shown in the historical image. Furthermore, in this example, if a temperature corresponding to a current image of the bearing does not match a temperature corresponding to a historical image, computing system 14 may estimate the expected angle based on multiple historical images. For example, computing system 14 may store a first image of the bearing that was captured when the temperature is 10° C., a second image of the bearing that was captured when the temperature is 0° C., and so on. In this example, if the current temperature is 10° C., computing system 14 may determine that the expected angle of the bearing is the same as the angle of the bearing shown in the first image. In this example, if the current temperature 5° C., computing system 14 may determine that the expected angle of the bearing is halfway between the angles of the bearing shown in the first image and the second image, assuming linear expansion of the bridge members. In other example, computing system 14 may perform a similar calculation assuming non-linear expansion of bridge members. Thus, in such examples, computing system 14 may determine the expected angle of the structural bearing based on the current temperature, the historical images, and the historical temperature measurements.

In some examples, computing system 14 may determine the expected angle based on the temperature and engineering characteristics of the structure. For example, computing system 14 may have engineering specifications of the structure, such as data on lengths and materials of applicable structural members of the structure. In this example, computing system 14 may calculate the expected lengths of structural members of the structure given the temperatures of the structural members and determine the expected angle of the bearing accordingly. For instance, the bearing may get further from vertical as the temperature gets hotter or colder.

Additionally, computing system 14 may determine an actual angle of the bearing relative to the base line. For example, computing system 14 may determine that an expected angle of the bearing should by 95°, given the temperature. In this example, computing system 14 may determine that the actual angle of the bearing relative to the same base line is 85°. Hence, in this example, the 10° difference in angle may indicate that the bearing is locked up.

To help a user interpret the image, computing system 14 superimposes a first line on the image. The first line indicates the expected angle. Additionally, computing system 14 superimposes a second line on the image. The second line indicates the actual angle. Thus, a user reviewing the image can easily see differences between the temperature-appropriate angle and the actual angle. This may enable the user to determine whether the bearing is seized up. In some examples, computing system 14 also superimposes the baseline onto the image.

In some examples, a tilt detection instrument in UAV 6 may detect a physical tilt of UAV 6 at a time camera 16 captures the image. In some examples, computing system 14 may use a tilt measurement generated by the tilt detection instrument to determine the base line. In some examples, computing system 14 uses readings from the tilt detection instrument to rotate the image to compensate for tilt of UAV 6. Furthermore, in some examples, an orientation detection instrument in UAV 6, such as a compass or gyroscope may determine a yaw and/or attitude of camera 16 at a time camera 16 captures the image. Computing system 14 may apply skew effects to the image to compensate for yaw and attitude variations between images.

Figure 2:
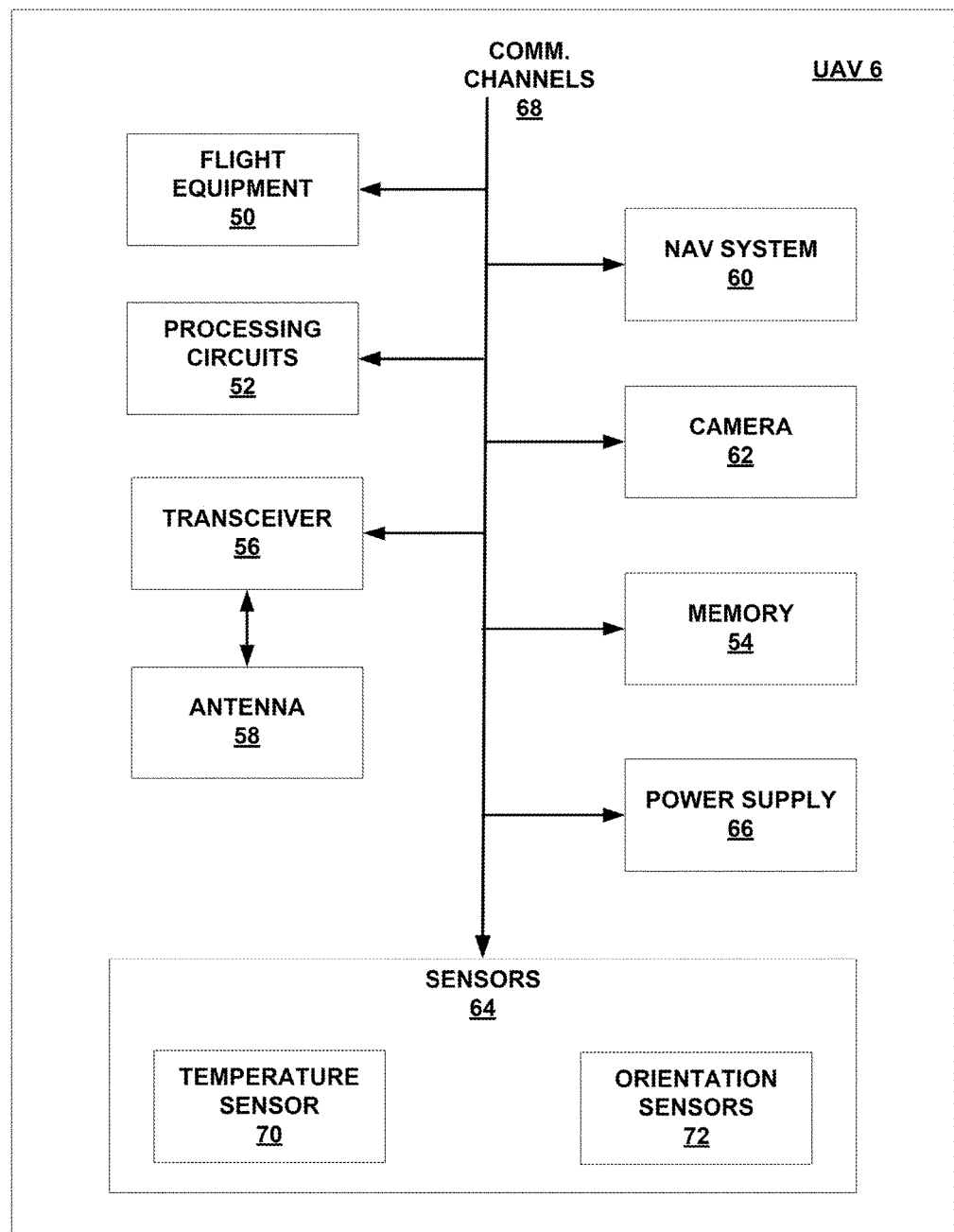
FIG. 2 is a block diagram illustrating example components of a UAV, in accordance with one or more techniques of this disclosure.

FIG. 2 is a block diagram illustrating example components of UAV 6, in accordance with one or more techniques of this disclosure. UAV 6 includes flight equipment 50, processing circuits 52, memory 54, transceiver 56, antenna 58, navigation system 60, camera 62, sensors 64, and power supply 66. Communication channels 68 interconnect each of flight equipment 22, processing circuits 52, memory 54, transceiver 56, antenna 58, navigation system 60, camera 62, sensors 64, and power supply 66 for inter-component communications (physically, communicatively, and/or operatively). In some examples, communication channels 68 may include a system bus, a network connection, an inter-process communication data structure, or any other method for communicating data. In some examples, power supply 66 is a battery.

Processing circuits 52 are intended to represent all processing circuitry and all processing capabilities of UAV 6. Processing circuits 52 may, for example, include one or more digital signal processors (DSPs), general purpose microprocessors, integrated circuits (ICs) or a set of ICs (e.g., a chip set), application specific integrated circuits (ASICs), field programmable logic arrays (FPGAs), or other equivalent integrated or discrete logic circuitry. Accordingly, the term "processor," as used herein may refer to any of the foregoing structures, or combination thereof, or any other structure suitable for implementation of the techniques described herein.

Memory 54 is intended to represent all of the various memory devices within UAV 6. Memory 54 constitutes a computer-readable storage medium and may take the form of either a volatile memory that does not maintain stored contents once UAV 6 is turned off or a non-volatile memory that stores contents for longer periods of time, including periods of time when UAV 6 is in an unpowered state. Examples of volatile memories include random access memories (RAM), dynamic random access memories (DRAM), static random access memories (SRAM), integrated random access memory (IRAM), thyristor random access memory (TRAM), zero-capacitor random access memory (ZRAM), or any other type of suitable volatile memory. Examples of non-volatile memory include optical disk drives, magnetic disk drives, flash memory, read only memory (ROM), forms of electrically programmable memories (EPROM) or electrically erasable and programmable memories (EEPROM), or any other such type of non-volatile memory.

The processing functionality of UAV 6 may be implemented by hardware, software, firmware, or combinations thereof. Memory 54 may store software and firmware that include sets of instructions. Processing circuits 52 and, other hardware components of UAV 6, may execute the instructions to perform certain parts of the techniques of this disclosure.

Processing circuits 52 may cause transceiver 56 to use antenna 58 to send data to controller device 10 (FIG. 1) and/or computing system 14 (FIG. 1). For example, processing circuits 52 may cause transceiver 56 to send image data, temperature data, and other data to computing system 14. Additionally, processing circuits 52 may configure transceiver 56 to receive data, such as instructions, from controller device 10.

Camera 62 is configured to capture images. In some examples, camera 62 captures images based on visible light. In some examples, camera 62 captures images based on infrared radiation.

Sensors 64 are intended to represent all the various sensors included in UAV 6. UAV 6 may, for example, include one or more sensors used for flight management, such as accelerometers, gyroscopes, magnetometers, barometers, Global Navigation Satellite Systems (GNSS) sensors, tilt sensors, inertial measurement sensors, speed sensors, and others. Particularly, in the example of FIG. 2, sensors 64 include a temperature sensor 70 and orientation sensors 72. As described elsewhere in this disclosure, temperature sensor 70 may detect a temperature, such as an air temperature or a temperature of a bridge component. Orientation sensors 72 may detect an orientation (e.g., attitude, yaw, tilt, etc.) of UAV 6. For instance, orientation sensors 72 may detect an angle of UAV 6 relative to a horizontal or vertical geometric plane. Computing system 14 may use data from orientation sensors 72 to rotate or skew images captured by camera 62 to regularize the resulting angle of view of a structural bearing shown in the images.

Figure 3:
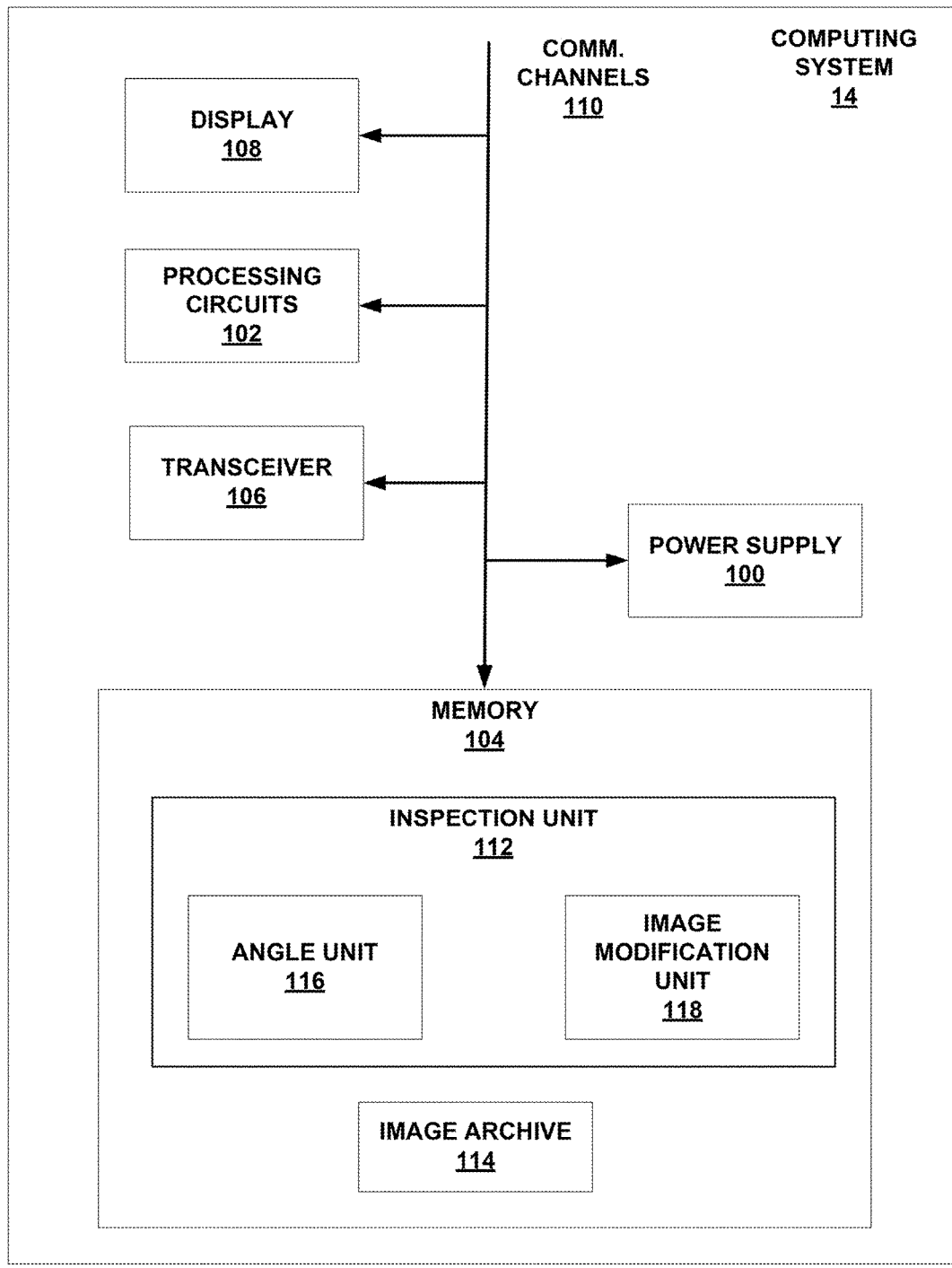
FIG. 3 shows an example illustration of a computing system, in accordance with one or more techniques of this disclosure.

FIG. 3 shows an example illustration of computing system 14, in accordance with one or more techniques of this disclosure. Computing system 14 includes power supply 100, one or more processing circuits 102, memory 104, transceiver 106, a display 108.

Communication channels 110 interconnect processing circuits 102, memory 104, transceiver 106, and display 108. Power supply 100 provides power to processing circuits 102, memory 104, transceiver 106 and display 108. Processing circuits 102, memory 104, transceiver 106, and display 108 may be implemented in a manner similar to processing circuits 52, memory 54, and transceiver 56 described above with respect to FIG. 2. Display 108 may comprise various types of displays for outputting data, such as liquid crystal displays, plasma displays, light emitting diode (LED) displays, and so on.

In the example of FIG. 3, memory 104 stores an inspection unit 112 and an image archive 114. Furthermore, as shown in the example of FIG. 3, inspection unit 112 comprises an angle unit 116 and an image modification unit 118. Inspection unit 112, angle unit 116, and image modification unit 118 may comprise instructions that, when executed by processing circuits 102, cause computing system 14 to perform actions ascribed in this disclosure to inspection unit 112, angle unit 116, and image modification unit 118.

In the example of FIG. 3, inspection unit 112 configures transceiver 106 to receive data from UAV 6 (FIG. 1). As a result, inspection unit 112 may receive various types of data from UAV 6. For example, inspection unit 112 may receive image data, temperature data, orientation data, and other types of data from UAV 6. Thus, transceiver 106 may be configured to receive an image captured by a camera mounted on an UAV, where the image is of a structural bearing, such as a hanger bearing or a rocker bearing. Additionally, transceiver 106 may be configured to receive a temperature measurement generated by an instrument mounted on the UAV.

Furthermore, in the example of FIG. 3, angle unit 116 may determine, based on a temperature, an expected angle of a structural bearing relative to a base line. For instance, angle unit 116 may determine the expected angle of the structural bearing based on historical images of the structural bearing and/or structural information, as described elsewhere in this disclosure. Additionally, angle unit 116 may determine an actual angle of the structural bearing relative to the base line. For instance, angle unit 116 may determine the actual angle of the structural bearing using an artificial neural network algorithm that has been trained to determine actual angles in a set of training images.

In some examples, to ease the determination of the expected angle and actual angle, angle unit 116 may rotate or skew an image such that the image appears to be taken from the same position as historical images of the same structural bearing. For instance, if the historical images are all taken with a tilt of 0° relative to the horizon, but a gust of wind occurring when UAV 6 captured a new image caused the new image to be taken with a tilt of 5° relative to the horizon, angle unit 116 may rotate the new image −5° to ensure that the new image is from an angle consistent with the historical images. Similarly, historical images of the structural bearing may be taken straight on at the structural bearing, but a camera of UAV 6 may be yawed 4° when taking a new image of the structural bearing. Accordingly, in this example, angle unit 116 may apply a skew of −4° to the new image to correct for the yaw.

Image modification unit 118 may superimpose a first line on an image of the structural bearing. The first line indicates the expected angle. Additionally, image modification unit 118 may superimpose a second line on the image. The second line indicates the actual angle.

Figure 4:
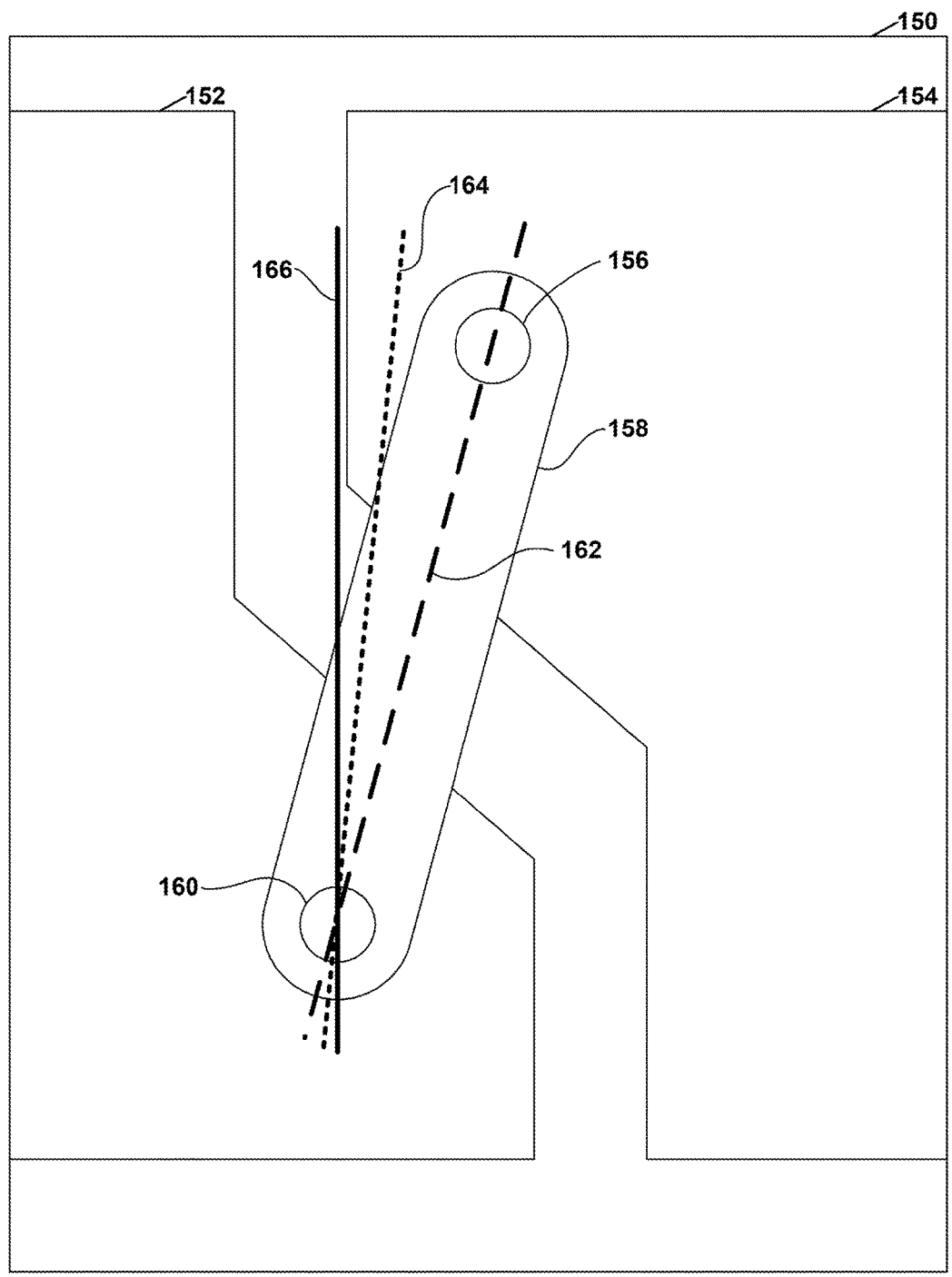
FIG. 4 is an example image of a pin-and-hanger assembly for an expansion joint of a structure, in accordance with a technique of this disclosure.

FIG. 4 is an example image 150 of a pin-and-hanger assembly for an expansion joint of a structure, in accordance with a technique of this disclosure. In the example of FIG. 4, image 150 shows a first structural member 152 and a second structural member 154. In some instances, first structural member 152 and second structural member 154 are beams of a bridge or other structure. A first pin 156 attaches a hanger 158 to structural member 154. A second pin 160 attaches hanger 158 to structural member 160.

In accordance with a technique of this disclosure, computing system 14 has superimposed an expected angle line 162, an actual angle line 164, and a baseline 166 on image 150. Expected angle line 162 indicates an angle that hanger 158 is expected to have given the temperature. Actual angle line 165 indicates an actual angle of hanger 158. Baseline 166 is a vertical line that a user may use for reference.

In some examples, structural member 152 is a suspended span and structural member 154 is an anchor span. Thus, an end of structural member 154 closest to the pin-and-hanger assembly is supported by a fixed point, such as a bridge pier. However, an end of structural member 154 is not supported by a fixed point, but rather is suspended from structural member 154. In some examples, as part of determining the expected angle of a structural bearing (e.g., the pin-and-hanger assembly of FIG. 4), computing system 14 may determine, based on a temperature measurement, an expected length of the suspended span. For example, computing system 14 may use the measured temperature to look up, in a lookup table, the expected length of a span of material x that is y meters at a standard temperature. Additionally, computing system 14 may determine the expected angle of hanger 158 based on the expected length of the suspended span. For example, computing system 14 may use lookup table to determine the expected angle based on the expected length of the suspended span.

Figure 5:
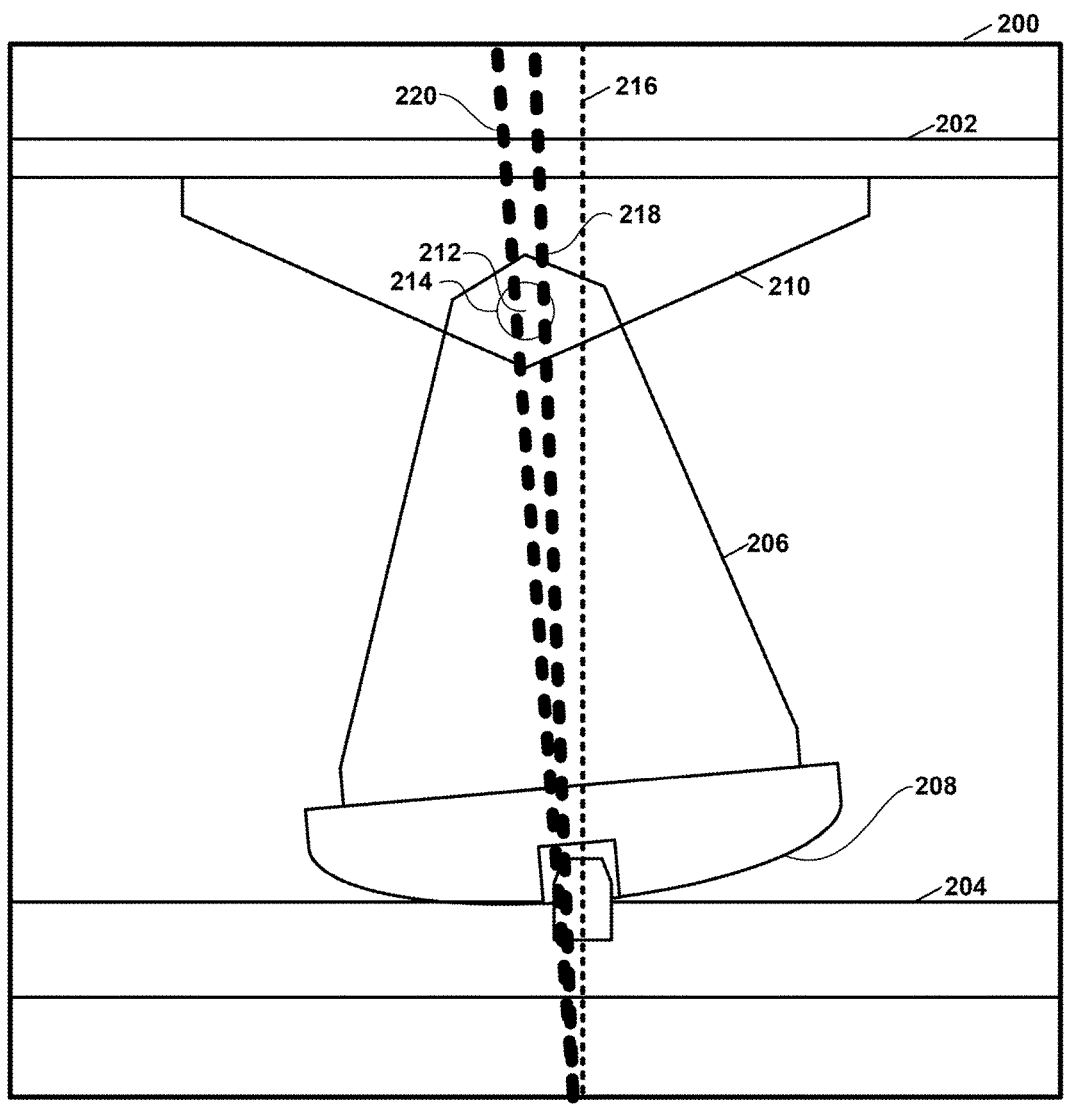
FIG. 5 is an example image of a rocker bearing, in accordance with a technique of this disclosure.

FIG. 5 is an example image 200 of a rocker bearing, in accordance with a technique of this disclosure. In the example of FIG. 5, image 200 shows a first structural member 202 and a second structural member 204. In one example, structural member 202 is a beam of a bridge and structural member 204 is a plate at a top of a pier of the bridge. Structural member 202 may expand or contract horizontally based on temperature. Additionally, in the example of FIG. 5, a rocker member 206 has a curved lower surface 208. Rocker member 206 is coupled to a bracket 210 at a pivot point 212. A pin 214 at pivot point 212 passes through corresponding openings defined by rocker member 206 and bracket 210.

In normal operation, an angle of rocker member 206 changes as structural member 202 expands and contracts. However, the rocker bearing may lock up if rocker member 206 is no longer able to rotate at pivot point 212, e.g., due to corrosion. If the rocker bearing is locked up, the actual angle of rocker member 206 might not correspond to an expected angle of rocker member 206. In some examples, the rocker bearing does not move correctly due to other conditions, such as an object being jammed into a gap between structural members.

In accordance with a technique of this disclosure, computing system 14 (FIG. 1) may determine, based on the temperature, an expected angle of rocker member 206 relative to a base line 216. Additionally, computing system 14 may determine an actual angle of rocker member 206 relative to base line 216. In the example of FIG. 5, computing system 14 superimposes a line 218 on image 200. Line 218 indicates the expected angle. Computing system 14 also superimposes a line 220 on image 200. Line 220 indicates the actual angle of rocker member 206. Although base line 216 is shown in FIG. 5 as a vertical line, in other examples, base line 216 may be a horizontal line or a diagonal line.

Figure 6:
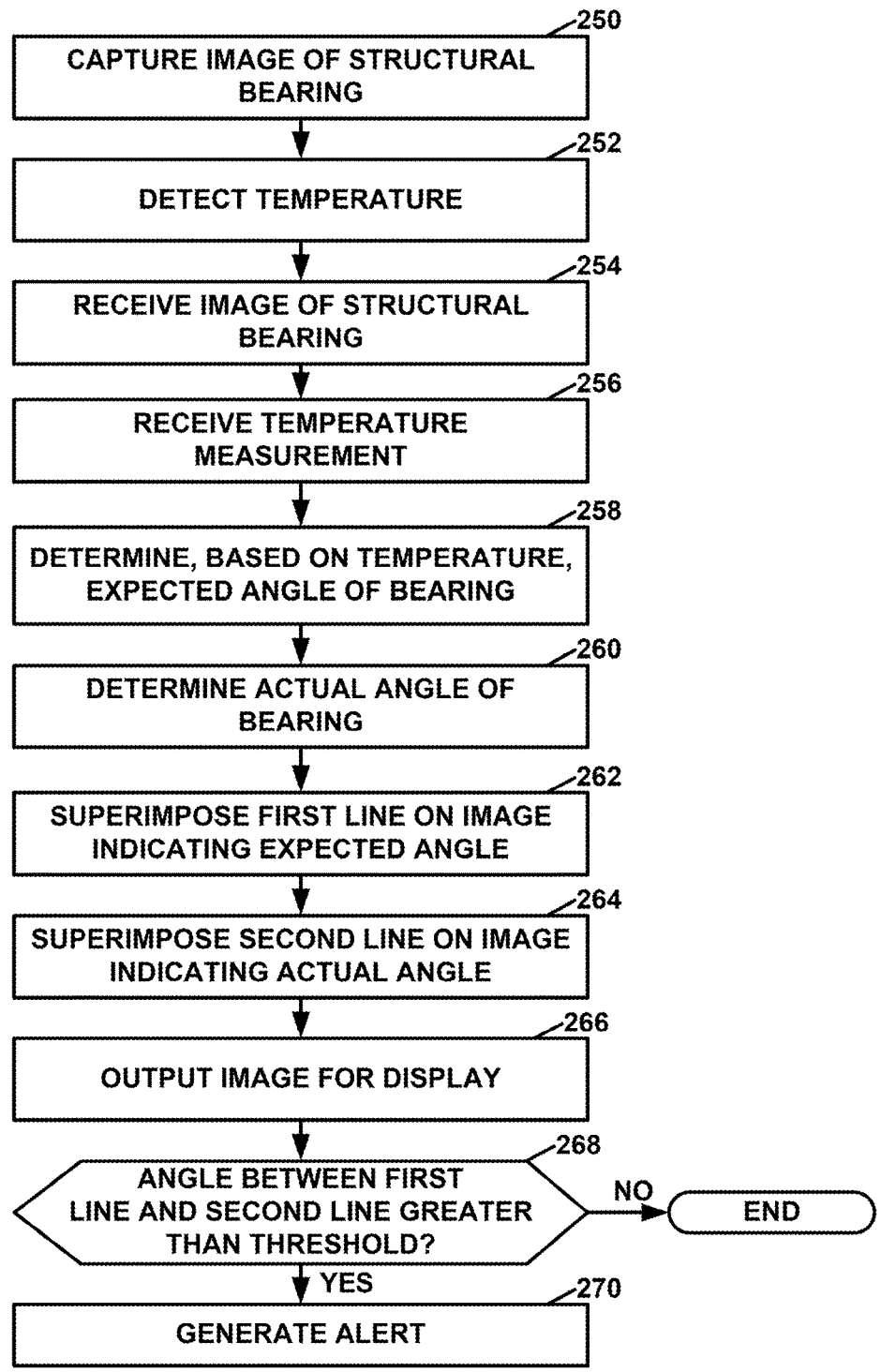
FIG. 6 is a flowchart illustrating an example operation in accordance with a technique of this disclosure.

FIG. 6 is a flowchart illustrating an example operation in accordance with a technique of this disclosure. The flowchart of FIG. 6 is provided as an example. In other examples, operations in accordance with techniques of this disclosure may include more, fewer or different actions. Moreover, the actions of FIG. 6 may be performed in different orders or in parallel.

In the example of FIG. 6, a camera mounted on an UAV (e.g., UAV 6 of FIG. 1 and FIG. 2) captures an image of a structural bearing (250). The structural bearing may be a hanger bearing, a rocker bearing, or another type of structural bearing for accommodating thermal expansion and contraction. Additionally, an instrument mounted on the UAV detects a temperature (252). The instrument may detect the temperature in accordance with any of the examples provided elsewhere in this disclosure. Subsequently, a computing system (e.g., computing system 14 of FIG. 1 and FIG. 3) receives the image (254). The computing system also receives the temperature measurement (256).

The computing system determines, based on the temperature, an expected angle of the bearing relative to a base line (258). Additionally, the computing system determines an actual angle of the bearing relative to the base line (260). The computing system may determine the expected angle and the actual angle in accordance with any of the examples provided elsewhere in this disclosure.

Additionally, the computing system superimposes a first line on the image (262). The first line indicates the expected angle. The computing system also superimposes a second line on the image (264). The second line indicates the actual angle. The computing system may superimpose the first line and the second line on the image by changing the values of pixels in the image such that the first line and the second line are visible in the image. In some examples, the computing system may output the image, with the superimposed lines, for display (266). For example, the computing system may send signals representing the image to a monitor for display.

Furthermore, in the example of FIG. 6, the computing system may determine whether an angle between the first line and the second line is greater than a threshold (268). For example, the threshold may be 5°, 10°, or another angle value. If the angle between the first line and the second line is not greater than the threshold ("NO" branch of 268), the computing system does not take any further action. However, if the angle between the first line and the second line is greater than the threshold, the structural bearing may be seized up. Accordingly, in the example of FIG. 6, the computing system may generate, based on an angle between the first line and the second line being greater than the threshold ("YES" branch of 268), an alert to indicate that the structural bearing is potentially seized up (270). The computing system may generate the alert in various ways. For example, the computing system may output an onscreen warning containing the alert. In some examples, the computing system sends an electronic message, such as an email, containing the alert. In some examples, the computing system generates data in a database indicating the structural bearing is potentially seized up.

Figure 7:
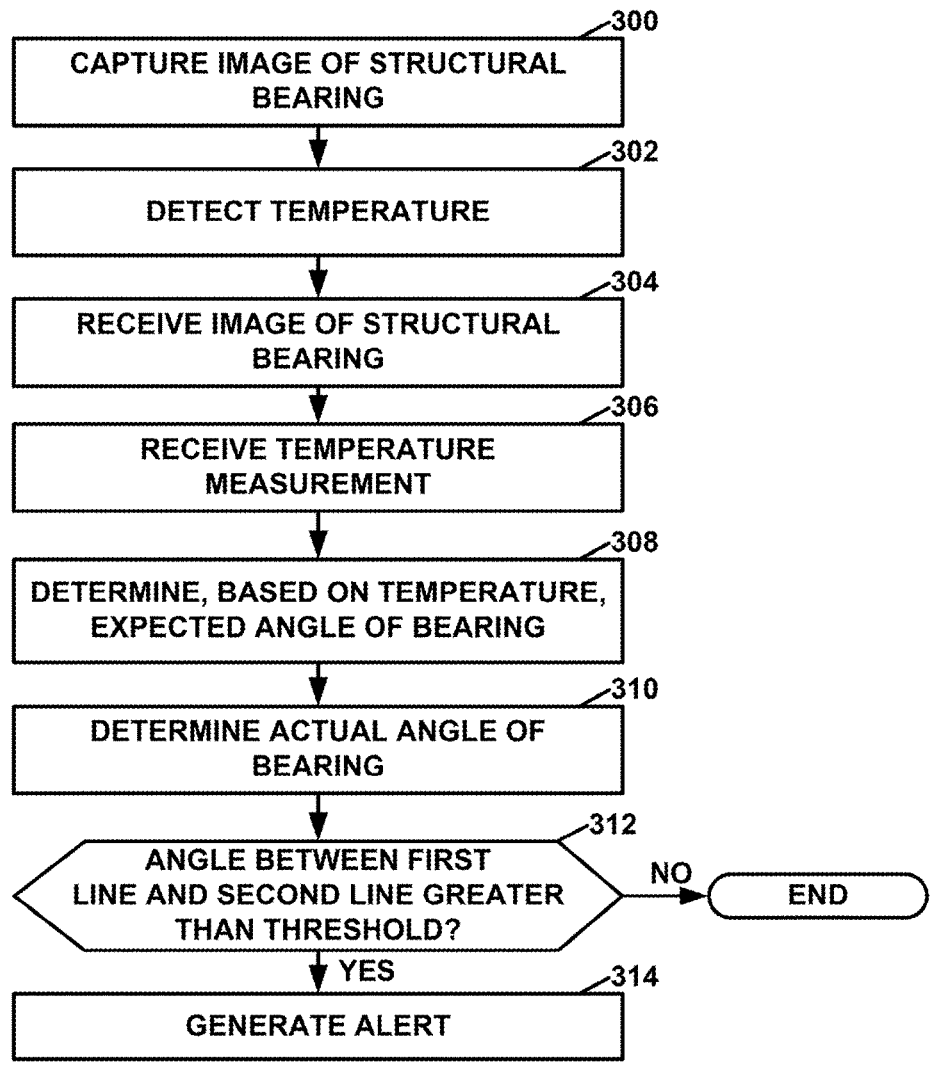
FIG. 7 is a flowchart illustrating an example operation in accordance with a technique of this disclosure.

FIG. 7 is a flowchart illustrating an example operation in accordance with a technique of this disclosure. The flowchart of FIG. 7 is provided as an example. In other examples, operations in accordance with techniques of this disclosure may include more, fewer or different actions. Moreover, the actions of FIG. 7 may be performed in different orders or in parallel.

In the example of FIG. 7, a camera mounted on an UAV (e.g., UAV 6 of FIG. 1 and FIG. 2) captures an image of a structural bearing (300). The structural bearing may be a hanger bearing, a rocker bearing, or another type of structural bearing for accommodating thermal expansion and contraction. Additionally, an instrument mounted on the UAV detects a temperature (302). The instrument may detect the temperature in accordance with any of the examples provided elsewhere in this disclosure. Subsequently, a computing system (e.g., computing system 14 of FIG. 1 and FIG. 3) receives the image (304). The computing system also receives the temperature measurement (306).

The computing system determines, based on the temperature, an expected angle of the bearing relative to a base line (308). Additionally, the computing system determines an actual angle of the bearing relative to the base line (310). The computing system may determine the expected angle and the actual angle in accordance with any of the examples provided elsewhere in this disclosure.

Furthermore, in the example of FIG. 7, the computing system may determine whether an angle between the first line and the second line is greater than a threshold (312). For example, the threshold may be 5°, 10°, or another angle value. If the angle between the first line and the second line is not greater than the threshold ("NO" branch of 312), the computing system does not take any further action. However, if the angle between the first line and the second line is greater than the threshold, the structural bearing may be seized up. Accordingly, in the example of FIG. 7, the computing system may generate, based on an angle between the first line and the second line being greater than the threshold ("YES" branch of 312), an alert to indicate that the structural bearing is potentially seized up (314). The computing system may generate the alert in various ways. For example, the computing system may output an onscreen warning containing the alert. In some examples, the computing system sends an electronic message, such as an email, containing the alert. In some examples, the computing system generates data in a database indicating the structural bearing is potentially seized up.

Although the foregoing description has been described with respect to cameras and instruments for measuring temperature mounted on UAVs, the techniques of this disclosure may be implemented in other ways. For example, the camera and instrument may be mounted on a robot configured to crawl along a structure. In another example, the camera and/or instrument may be handheld or mounted on a support such as a tripod.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for inspecting an expansion joint, the method comprising:
   receiving, by a computing system, an image captured by a camera, the image being of a structural bearing, wherein the structural bearing is a hanger bearing or a rocker bearing;
   receiving, by the computing system, a temperature measurement generated by an instrument;
   determining, by the computing system, based on the temperature, an expected angle of the structural bearing relative to a base line;
   determining, by the computing system, an actual angle of the structural bearing relative to the base line;
   superimposing, by the computing system, a first line on the image, the first line indicating the expected angle; and
   superimposing, by the computing system, a second line on the image, the second line indicating the actual angle.

2. The method of claim 1, wherein:
   the temperature is a current temperature,
   the method further comprises:
      storing, by the computing system, a plurality of historical images of the structural bearing; and
      storing, by the computing system, a plurality of historical temperature measurements, wherein the plurality of historical temperature measurements includes a corresponding temperature measurement for each historical image of the plurality of historical images, and
   determining the expected angle of the structural bearing comprises determining, by the computing system, the expected angle of the structural bearing based on the current temperature, the historical images, and the historical temperature measurements.

3. The method of claim 1, wherein:
   the structural bearing is coupled to a suspended span and an anchor span, and
   determining the expected angle of the structural bearing comprises:
      determining, by the computing system, based on the temperature measurement, an expected length of the suspended span; and
      determining, by the computing system, the expected angle based on the expected length of the suspended span.

4. The method of claim 1, further comprising:
   generating, by the computing system, based on an angle between the first line and the second line being greater than a threshold, an alert to indicate that the structural bearing is potentially seized up.

5. The method of claim 1, further comprising:
   after superimposing the first line and the second line on the image, outputting, by the computing system, the image for display.

6. The method of claim 1, wherein the camera and instrument are mounted on an Unmanned Aerial Vehicle.

7. A computing system comprising:
   a transceiver configured to:
      receive an image captured by a camera, the image being of a structural bearing, wherein the structural bearing is a hanger bearing or a rocker bearing; and
      receive a temperature measurement generated by an instrument; and
   one or more processing circuits configured to:
      determine, based on the temperature, an expected angle of the structural bearing relative to a base line;
      determine an actual angle of the structural bearing relative to the base line;
      superimpose a first line on the image, the first line indicating the expected angle; and
      superimpose a second line on the image, the second line indicating the actual angle.

8. The computing system of claim 7, wherein:
   the temperature is a current temperature,
   the computing system comprises a memory configured to:
      store a plurality of historical images of the structural bearing; and
      store a plurality of historical temperature measurements, wherein the plurality of historical temperature measurements includes a corresponding temperature measurement for each historical image of the plurality of historical images, and
   the one or more processing circuits are configured such that, as part of determining the expected angle of the structural bearing, the one or more processing circuits determine the expected angle of the structural bearing based on the current temperature, the historical images, and the historical temperature measurements.

9. The computing system of claim 7, wherein:
   the structural bearing is coupled to a suspended span and an anchor span, and the one or more processors are configured such that, as part of determining the expected angle of the structural bearing, the one or more processing circuits:
  determine, based on the temperature measurement, an expected length of the suspended span; and
  determine the expected angle based on the expected length of the suspended span.

10. The computing system of claim 7, wherein the one or more processing circuits are further configured to generate, based on an angle between the first line and the second line being greater than a threshold, an alert to indicate that the structural bearing is potentially seized up.

11. The computing system of claim 7, wherein the one or more processors are further configured to:
  after superimposing the first line and the second line on the image, output the image for display.

12. The computing system of claim 7, wherein the camera and instrument are mounted on an Unmanned Aerial Vehicle.

13. A non-transitory computer-readable storage medium having instructions stored thereon that, when executed, configure a computing system to:
  receive an image captured by a camera, the image being of a structural bearing, wherein the structural bearing is a hanger bearing or a rocker bearing;
  receive a temperature measurement generated by an instrument;
  determine, based on the temperature, an expected angle of the structural bearing relative to a base line;
  determine an actual angle of the structural bearing relative to the base line;
  superimpose a first line on the image, the first line indicating the expected angle; and
  superimpose a second line on the image, the second line indicating the actual angle.

14. The computer-readable storage medium of claim 13, wherein:
  the temperature is a current temperature,
  execution of the instructions further configures the computing system to:
    store a plurality of historical images of the structural bearing; and
    store a plurality of historical temperature measurements, wherein the plurality of historical temperature measurements includes a corresponding temperature measurement for each historical image of the plurality of historical images, and
  as part of configuring the computing system to determine the expected angle of the structural bearing, execution of the instructions configures the computing system to determine the expected angle of the structural bearing based on the current temperature, the historical images, and the historical temperature measurements.

15. The computer-readable storage medium of claim 13, wherein:
  the structural bearing is coupled to a suspended span and an anchor span, and
  execution of the instructions further configures the computing system to determine the expected angle of the structural bearing comprises:
    determining, by the computing system, based on the temperature measurement, an expected length of the suspended span; and
    determining, by the computing system, the expected angle based on the expected length of the suspended span.

16. The computer-readable storage medium of claim 13, wherein execution of the instructions further configuring the computing system to:
  generate, based on an angle between the first line and the second line being greater than a threshold, an alert to indicate that the structural bearing is potentially seized up.

17. The computer-readable storage medium of claim 13, wherein the instructions, when executed, further configure the computing system to:
  after superimposing the first line and the second line on the image, output the image for display.

18. The computer-readable storage medium of claim 13, wherein the camera and instrument are mounted on an Unmanned Aerial Vehicle.

* * * * *